United States Patent [19]
Mitton

[11] Patent Number: 4,718,330
[45] Date of Patent: Jan. 12, 1988

[54] HYDRAULIC CYLINDER

[75] Inventor: Bruce W. Mitton, Fayette, Ohio

[73] Assignee: Eltra Corporation, Toledo, Ohio

[21] Appl. No.: 339,947

[22] Filed: Jan. 18, 1982

[51] Int. Cl.⁴ ............................................. F16J 1/10
[52] U.S. Cl. .................................... 92/129; 92/143; 91/422; 137/491
[58] Field of Search ............ 91/422, 435, 437; 92/8, 92/9, 13, 129, 143, 169; 137/110, 489, 489.3, 491, DIG. 2, 513.5, 513.7

[56] References Cited

U.S. PATENT DOCUMENTS

| | | | |
|---|---|---|---|
| 3,180,355 | 4/1965 | Long | 137/491 |
| 3,368,751 | 2/1968 | Merrill | 92/169 |
| 3,727,635 | 4/1973 | Todd | 137/513.5 |
| 3,771,554 | 11/1973 | Hassall | 137/491 |
| 3,987,814 | 10/1976 | Hall | 137/491 |
| 4,013,093 | 3/1977 | Pensa | 137/491 |
| 4,050,359 | 9/1977 | Mayer | 92/129 |
| 4,343,328 | 8/1982 | Junger | 137/491 |

*Primary Examiner*—Donald P. Walsh
*Assistant Examiner*—Richard L. Klein

*Attorney, Agent, or Firm*—Allegretti, Newitt, Witcoff & McAndrews, Ltd.

[57] ABSTRACT

A hydraulic cylinder usable as a shock-absorbing trim and tilt cylinder for adjusting the position of an outboard motor or outdrive unit of a boat, is provided with a piston including pilot-operated valve means which stepwise responds at a precisely setable pressure, to pressures resulting from impact of an outboard motor or outdrive unit upon an obstacle, the valve means then departing as a poppet-type relief valve to allow the outboard motor or outdrive unit to return to operative position following the impact. The hydraulic cylinder is provided with an integral conduit formed by milling a groove or slot from a point adjacent its mounting end to the point adjacent its rod end, and fastening a cover over the groove. The cylinder's mounting eye end is provided with passages that cooperate with passages in its mounting pin to supply hydraulic fluid to first and second chambers defined by the piston within the cylinder, one of the passages in the mounting eye end intersecting the integral conduit to supply fluid to the rod-end chamber defined by the piston.

8 Claims, 7 Drawing Figures

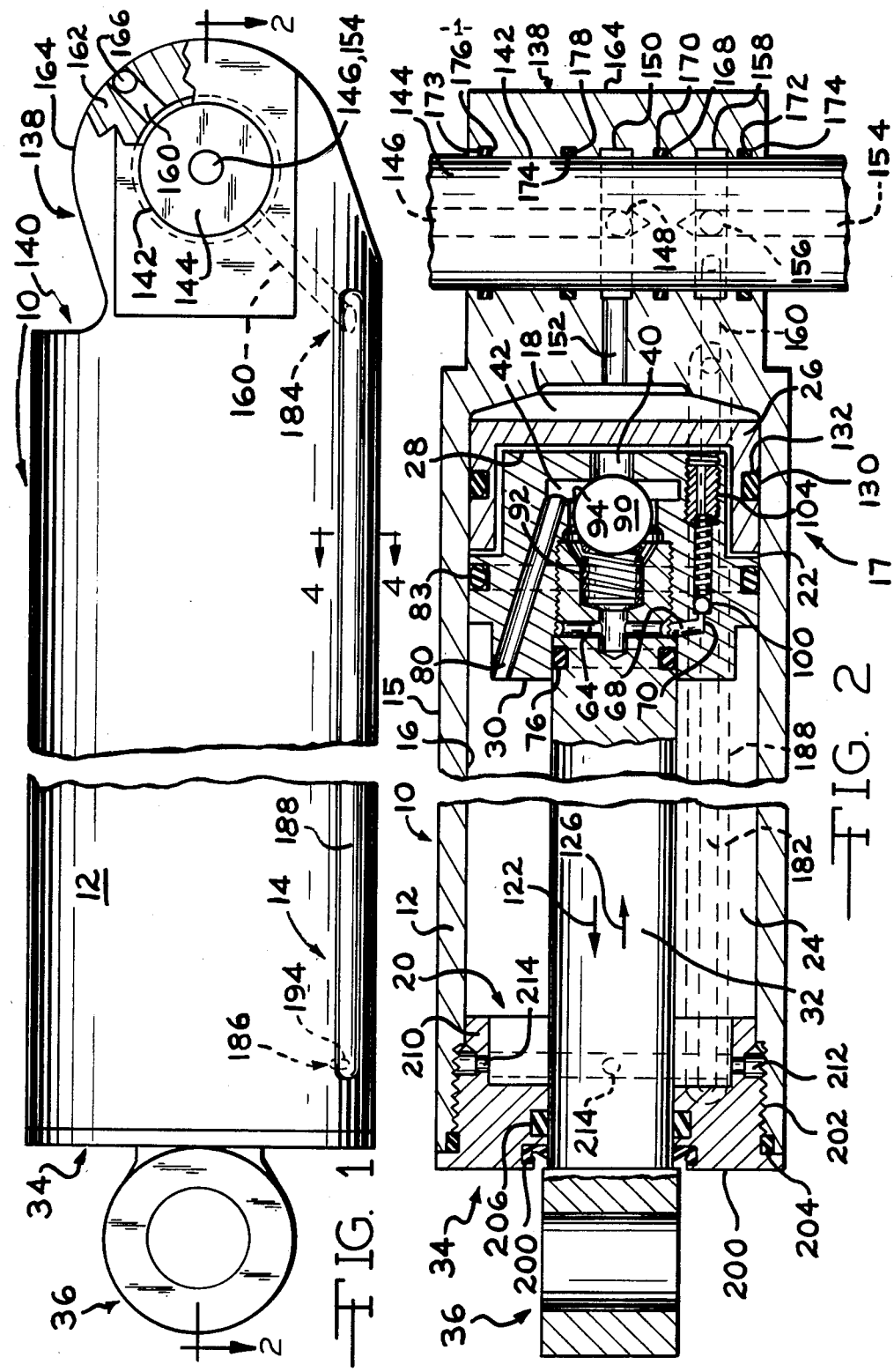

HYDRAULIC CYLINDER

The instant application is related to the field of hydraulics. In particular, this application relates to the structure of pistons and housings of hydraulic cylinders.

BACKGROUND OF THE INVENTION

Hydraulic cylinders, such as are useful in numerous applications, have been provided with valved pistons, for use as shock absorbers, and with pistons including valves suiting them for shock absorber use on boats, for tilting, or for trimming and tilting a drive unit for a boat such as an outboard motor or an outdrive unit, for allowing it to pivot upwardly when the propulsion unit strikes an obstacle, to avoid damage to the propulsion unit, and to let the propulsion unit return to operative position in a controlled manner following contact with the obstacle, if warranted. Such shock absorbers have been provided with stop pistons, providing an adjustable retracted-position cylinder end, which could be moved under hydraulic control to set a trim position for the outdrive or outboard unit, and cause the piston, and the drive unit, to return to a preset trim position following collision with an obstacle.

In order to obtain the flow rates necessary through the shock absorber piston to allow rapid movement when an associated outboard motor or outdrive unit strikes an obstacle, numerous small valves are conventionally used. In one such system, a piston is provided with seven small valves, acting as paralleled jounce valves, for allowing the piston to move upon contact of the drive unit with an obstacle, and an eighth rebound valve to allow the drive unit to return to operative position. The use of this multitude of valves, while functional, has certain deficiences. For instance, the use of eight separate valves provides eight separate hydraulic leak paths, any of which may interfere with the proper operation of the hydraulic cylinder. Eight separate valve seats must be machined in bores through the piston, seven substantially identical precision springs must be selected or obtained, since it is not practicable to make all eight valves individually adjustable, or to adjust the valves to begin to open at a definite pressure in a simple manner. Also, the individual poppet-type relief valves are not precisely controllable, to provide an operating pressure which may be set to correspond to the mechanical strength of the outboard motor or outdrive unit members to act only when it is necessary to protect them from damage. If the pressure of these multiple relief valves is set too high, the structure of the drive unit will be damaged. If set too low, the drive unit may spend excessive time with its propeller out of the water, increasing the opportunity for engine damage, or, accelerating with the propeller rotation reversed may pull the outboard motor or outdrive unit out of the water, also causing overspeed. This adjustment is difficult and troublesome, since poppet-type valves are proportionally responsive, allowing some flow at a low pressure and greater flow at greater pressure. Valves which allow adequate flow at impact-caused pressure may allow the drive unit to gradually be pulled out of the water by reversed operation of the drive unit.

As a partial solution to this problem, a single large valve which operates in a stepwise manner at a predetermined and easily adjustable pressure has been provided, and placed adjacent to the hydraulic cylinder, to provide a precisely controllable operating pressure. Such a device is disclosed in co-pending application Ser. No. 146,891, filed May 5, 1980. This device, while providing improved performance, is placed remote from the piston of the hydraulic cylinder, so that its actuation in the presence of the impulse pressure caused by an outboard motor or outdrive unit striking an obstacle is delayed by the mechanical expansion of the components subject to the impulse pressure, so that the structure of the outboard motor or outdrive unit may be subjected to considerable mechanical stress before the pressure at the relief valve rises to its preset operating pressure, necessitating that the relief valve be set at a lower than optimum pressure to ensure protection of other mechanical components.

Also, in order to supply hydraulic fluid to both ends of a hydraulic cylinder, so that a piston, or a stop piston, may be moved in both directions within the cylinder, complicated and potentially fragile structure has been provided. Separate lines have been provided between a source of hydraulic fluid, such as a reversible hydraulic pump, and the opposite ends of the hydraulic cylinder. These separate lines provide two separate potential failure items, which may be degraded by age and weathering, or be caught and torn upon an obstacle. As is known, one end of a cylinder may be supplied with hydraulic fluid through a mounting pin, which includes conduits or passages which align with conduits or passages in the housing of the hydraulic cylinder. The opposite end of the hydraulic cylinder is conventionally supplied with fluid by placing a separate conduit or hose along the side of the housing of the hydraulic cylinder, and which may be fastened to the side of the hydraulic cylinder, such as by welding. It is also known to use a hollowed rib, such as a hollowed rib used to protect tie bolts used in a cylinder assembly with a separate cylinder tube and end caps, to convey working fluid to the end of the cylinder remote from the mounting pin or pivot.

Such external conduit means are often complex and difficult to assemble, contain numerous fittings which may be apt to leak, or present undesirable protrusions from the hydraulic cylinder.

The instant invention provides a hydraulic cylinder which overcomes these and other deficiencies of previous similar cylinders.

SUMMARY OF THE INVENTION

The instant invention provides a hydraulic cylinder, usable as a shock absorber in numerous applications, or as a trim and tilt cylinder for use with an outboard motor or outdrive unit of a boat, which includes a valve structure in its piston which acts as a single, large area, pilot-operated jounce valve, capable of operating at a precise and predeterminable high pressure, in immediate and stepwise response to pressures generated within the hydraulic cylinder such as by a collision of the outboard motor or outdrive unit with an obstacle, such as an underwater obstacle, and which, using the same valve components, acts as a low-pressure poppet-type proportional-flow jounce valve, to allow the outboard motor or outdrive unit to return to its operating position in a controlled manner, with the different forces applied to the hydraulic cylinder due to the varying geometry of the outboard motor or outdrive system as it returns to initial position producing differing flows through the jounce valve. Also, to avoid expensive and troublesome external lines, a hydraulic cylinder according to the invention includes mounting means which are adapted to cooperate with a mounting pin or pivot provided with conduits connected to a source of hydraulic fluid, to supply hydraulic fluid to both ends of the hydraulic cylinder. A first passage or conduit directly connects a first of the two chambers defined by the piston within the hydraulic cylinder to the source of fluid, and a second passage or conduit interconnects the conduit of the mounting pin or pivot with a conduit formed by milling a slot along the side of the hydraulic cylinder, between a point adjacent the mounting end, to a point adjacent the far or rod end, and fastening a cover over the slot, such as by welding, to form an integral conduit to provide hydraulic fluid to a second chamber at the rod end of the hydraulic cylinder.

Thus, it is a primary object of the invention to provide a hydraulic cylinder with a piston including valve means including a first large valve assembly, and a second smaller valve assembly, the second smaller valve assembly acting as a pilot valve to provide the first valve with a stepwise response at a predetermined pressure when the piston is moved in a first direction within the cylinder, the first valve assembly also acting as a low-pressure poppet-type relief valve, operable in a proportional manner at a substantially lower pressure when the piston is caused to be moved in a second direction. It is an advantage of the invention that a single large valve may be used in place of a multiple of smaller valves. It is a feature of the invention that this single large valve, with stepwise operation, may be preset to operate in a stepwise manner at a repeatable, definite, and easily setable predetermined pressure.

It is a further advantage of the invention that such a valve may be made operable in a linear manner, in an opposite direction, at a lower pressure, providing a proportional response at a lower pressure applied in an opposite direction to the first high pressure. It is an advantage of the invention that no separate valve structure need be provided for a rebound or return valve in the piston of a hydraulic cylinder according to the invention. It is a feature of the invention that the spring means which serves to retain a valve element of the large valve in a desired position when the valve is unpressurized also serves as the spring of a proportionally-responsive poppet valve in response to reversed pressure across the piston.

It is a further object of the invention to provide a housing for a hydraulic cylinder with an integral conduit, so that hydraulic connections to both ends of the cylinder may be physically made at only a single end. It is an advantage of the invention that structure external to the housing may be avoided. It is a feature of the invention that an integral conduit is formed by milling a slot along the side of the housing between points adjacent to the first and second ends of the cylinder, and welding a cover member over the slot, to form an integral conduit, which is connected to the source of hydraulic fluid by a bore or conduit in the mounting portion of the hydraulic cylinder, and connected to the interior of the cylinder at the far end by providing an aperture through the wall of the housing.

BRIEF DESCRIPTION OF THE DRAWINGS

Other objects, advantages and features of the invention may be appreciated from the drawings and descriptions which follow.

FIG. 1 is a side elevational view, partially in section, of a hydraulic cylinder according to the invention.

FIG. 2 is a sectional view, taken along line 2—2 in FIG. 1.

DETAILED DESCRIPTION OF THE INVENTION

Figure 3:
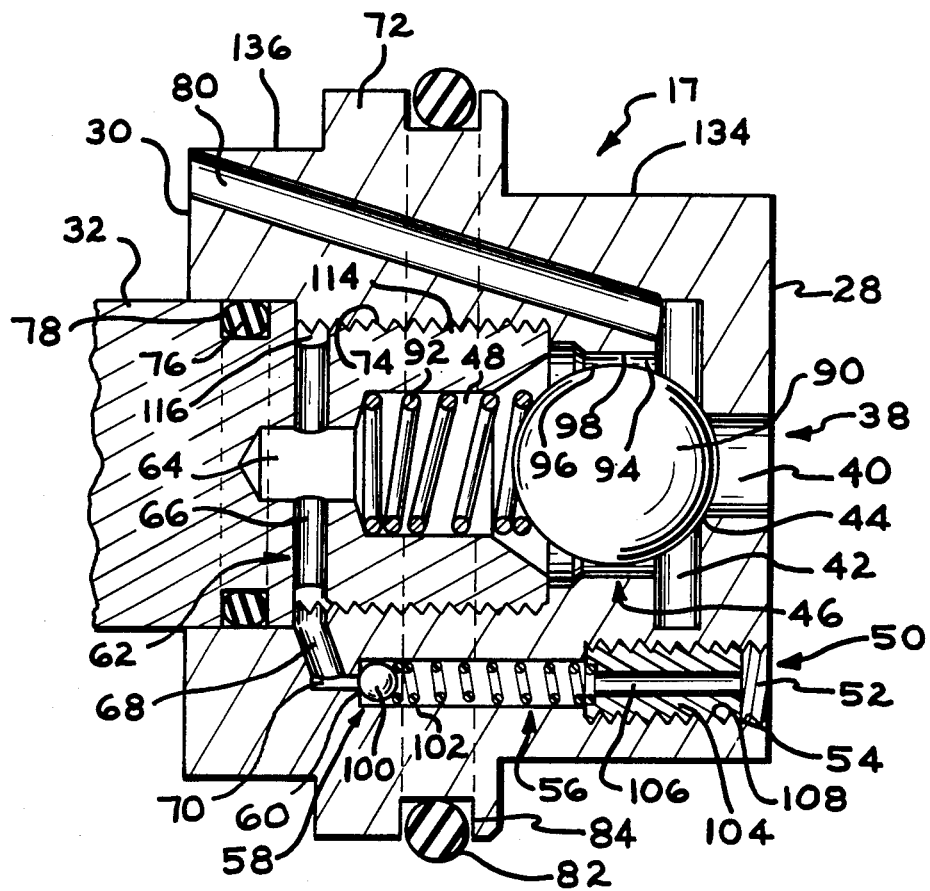
FIG. 3 is a detail view of a piston assembly including valve means according to the invention.

Referring to the drawings, there is shown a hydraulic cylinder 10 having a housing 12 with an integral conduit 14, and including a piston 17 incorporating valve means according to the invention.

As can be best seen in FIG. 2, housing 12 defines an exterior or outer surface 15 and an inner surface 16 which defines a working chamber having a first end 18 and a second end 20. As shown, piston 17 divides this working chamber into a first chamber 22 and a second chamber 24.

As best shown in FIG. 2, the preferred embodiment includes a conventional cup-shaped stop piston 26 in chamber 22, between piston 17 and end 18, to provide in conventional manner an effective variable-length cylinder or variable retracted position cylinder. Such stop pistons are conventionally used in various applications, including use in marine trim and tilt systems for outboard motors and outdrive units, so that the trim position may be adjusted under hydraulic control, instead of being set by a cam controlled by a pull wire, or by stop pins which may be repositioned, so that optimum drive unit and hull trim may be established and maintained even if the distribution of loads within the boat is changed during its operation.

As can be seen most clearly in FIGS. 2 and 3, piston 17 has a first surface disposed adjacent first end 18, and a second surface 30 disposed adjacent second end 20. As can also be seen, the piston assembly, and the valve means incorporated in piston 17, includes a portion of piston rod 32, which protrudes from the second surface 30 of piston 17, extends through second chamber 24 and protrudes from first or rod end 34 of cylinder 10. As will become apparent, piston rod 32 provides a convenient method of adjusting rebound pressure, should such be desired. As shown, piston rod 32 includes a conventional eye portion 36, to provide a pivotable connection to any desired mechanical element. In the preferred use of the preferred embodiment of the invention, eye portion 36 is connected to a conventional outboard motor or outdrive unit.

As can be seen most clearly in FIG. 3, piston 17 includes an axially and linearly extending aperture 38. Although described and shown as lying on the central axis of piston rod 32, it will be apparent that it need not lie on the axis of piston rod 32, and that, if desired, piston 17 may easily be modified to allow the valve structure according to the invention to be used with a double-ended cylinder. As shown, axially and linearly extending aperture 38 includes a first entry portion 40, a valve seat portion 42 including a valve seat 44 in communication with entry portion 40, a valve pocket portion 46 in communication with entry portion 40, and a first spring pocket portion 48 in communication with valve pocket 46. Piston 17 also includes a second axially and linearly extending aperture 50, which also may be repositioned as necessary without departing from the scope and spirit of the invention, which includes a second entry portion formed in first surface 28, shown as provided with screw threads 54, a second spring pocket portion 56 in communication with entry portion 52 and a second valve seat portion 58 including a valve seat 60.

As can be seen, various passages are defined by piston 17 interconnecting apertures 38 and 50. As shown, a first passage 62 interconnects spring pocket 48 and valve seat 60 of valve seat portion 58. As can be seen, passage 62 includes several parts, including a first part 64 shown as an axial extension of spring pocket 48, a cross bore 66, an angled bore 68 and a passage 70.

As can be seen, spring pocket 48, first part 64, and cross bore 66 are formed in a portion of piston rod 32, which engages the body 72 of valve 16 threadably, by means of mating threads 74, and includes seal means shown as an O-ring 76 in seal groove 78. As can be seen in FIG. 3, angled bore 68 may be conveniently formed before assembly of piston rod 32 and piston body 72. Also, a second passage or bore 80 interconnects second surface 30 and valve seat portion 42.

Body 72 sealingly engages inner surface 16 by means of seal means shown as O-ring 82 disposed in seal groove 84.

As shown in FIGS. 2 and 3, a first valve element 90 shown as a valve ball is disposed in valve pocket portion 46, and urged against valve seat 44 by a resilient means shown as a spring 92 disposed in first spring pocket 48. A small aperture, here shown as a gap, interconnects valve seat portion 44 and first spring pocket portion 48. As shown, valve ball 90 is selected so as to define a small gap 94 between its surface 96 and a peripheral wall 98 of valve pocket portion 46. As will become apparent, the flow area of gap 94 must be smaller than the flow area of passage 70 for proper operation of the disclosed valve means.

A second valve element shown as valve ball 100 is disposed in second valve seat portion 58, and urged against valve seat 60 by a resilient means shown as a spring 102 disposed in second spring pocket portion 56. Spring 102 is retained by an apertured plug 104 having an axial aperture 106, which may be a hexagonal aperture, if desired, and screw threads 108, which cooperate with screw threads 54 to retain aperture plug 104 in second entry portion 52.

As can be seen, assembling a piston 17 according to the invention is a simple and convenient operation. Valve ball 100 is placed in second aperture 50, and followed by spring 102 and apertured plug 104, which is subsequently rotated to adjust the force provided to valve ball 100 by spring 102. A valve ball 90 is placed against seat 44, a spring 92 is placed in first spring pocket 48, which is preferably formed in an end portion 114 of piston rod 32, an O-ring 76 is placed in seal groove 78, and rod 32 is screwed into body 72 by means of mating threads 74. To avoid the necessity of precising positioning cross bore 66 in alignment with angle bore 68, cross bore 66 is connected to an annular groove 116, which may, if desired, be made wider than the diameter of angle bore 68, so that mating threads 74 may be used to adjust the pressure applied to valve ball 90 by spring 92.

As will be apparent, when a force is supplied to piston rod 32 to urge it to move in a first or jounce direction shown by arrow 122, the fluid pressure against second surface 32 will increase. This increased pressure will cause fluid to attempt to flow through second passage or bore 80 to valve seat portion 42, where its passage through entry portion 40 is blocked by valve ball 90. However, due to the small aperture shown as gap 94, this pressure also appears in first spring pocket portion 48, first part 64, cross bore 66 and annular groove 16 of first passage 62, angle bore 68 and passage 70. When the pressure in passage 70 exceeds the pressure which will cause movement of valve ball 100 away from valve seat 60, hydraulic fluid will flow past valve ball 100, through second spring pocket portion 58 and entry portion 52. A slight movement of valve ball 100 will thus cause a sudden drop in the pressure appearing in passage 70, angle bore 68, cross bore 66 and first spring pocket portion 48. Then, the pressure appearing at second surface 30 and in valve seat portion 42 being higher than the pressure appearing in first spring pocket portion 48, valve ball 90 will be stepwise pushed off valve seat 44, and fluid will flow from valve seat portion 42, through entry portion 40, to relieve the pressure appearing at second surface 30. By making the flow area of the aperture shown as gap 94 substantially smaller than the flow area of passage 70, a very small movement of valve ball 102 will be sufficient to cause full opening of the valve defined by valve ball 90 and valve seat 44. This also avoids the necessity of conventional complicated machining operations for providing fluid passages around springs which may assume their solid height during a jounce cycle, since, in the instant invention, there is very little change in length of spring 102, and spring 92, which serves largely only to hold valve ball 90 against seat 44 against the force of gravity and other nonspecific accelerations, is not part of the main flow path through valve seat portion 42.

When a force is applied to piston rod 32 in a second or rebound direction as shown by arrow 126, fluid in first chamber 22 will apply pressure to first surface 28. When this pressure rises to a low value, such as approximately 30 to 50 pounds per square inch, valve ball 90 will begin to be displaced from valve seat 44, allowing the flow of fluid through entry portion 40, valve seat portion 42 and passage or bore 80, to second chamber 24. As will be apparent, a higher pressure present at first surface 28 will cause a greater deflection of valve ball 90, and a greater opening between valve ball 90 and valve seat 44 proportional to applied pressure. There is no flow through valve spring pocket 48 or past valve ball 100, since, preferably, a pressure of 2,000 to 3,000 pounds per square inch is necessary to deflect valve ball 100.

Of course, this desired pressure varies with the diameter of housing 12 of hydraulic cylinder 10, as well as with the designed load of associated mechanical components. This desired operating pressure may be easily adjusted by placing piston 16 in a tubular fixture to apply fluid pressure against second surface 30 of a desired magnitude. Then, apertured plug 104 is rotated in screw threads 54 to vary the force applied to valve ball 100 by a spring 102 until fluid begins to flow from first entry portion 40. Thus, a single easy adjustment, as opposed to selection of a matched set of precision springs, is sufficient to set an actuating pressure, and, the valve action is stepwise upon actuation, rather than having an opening proportional to applied pressure, which is believed to cause greater mechanical fatigue of associated mechanical components.

This flow allows piston 17 to move in the direction shown by arrow 126 until it is mechanically stopped. In the preferred embodiment, piston 17 is mechanically stopped by a conventional cup-shaped stop piston 26, which sealingly engages inner surface 16 by means of O-rings 130 in seal grooves 132. Body 72 of piston 17 is provided with a stepped portion 134 which cooperates with cup-shaped stop piston 26 so that piston 17 retains stop piston 26 in proper alignment within housing 12, and stop piston 26 helps to support piston 17 against transverse loads. Body 72 is also provided with a second stepped portion 136 adjacent second surface 30, for a similar purpose when piston rod 32 is fully extended.

Figure 5:
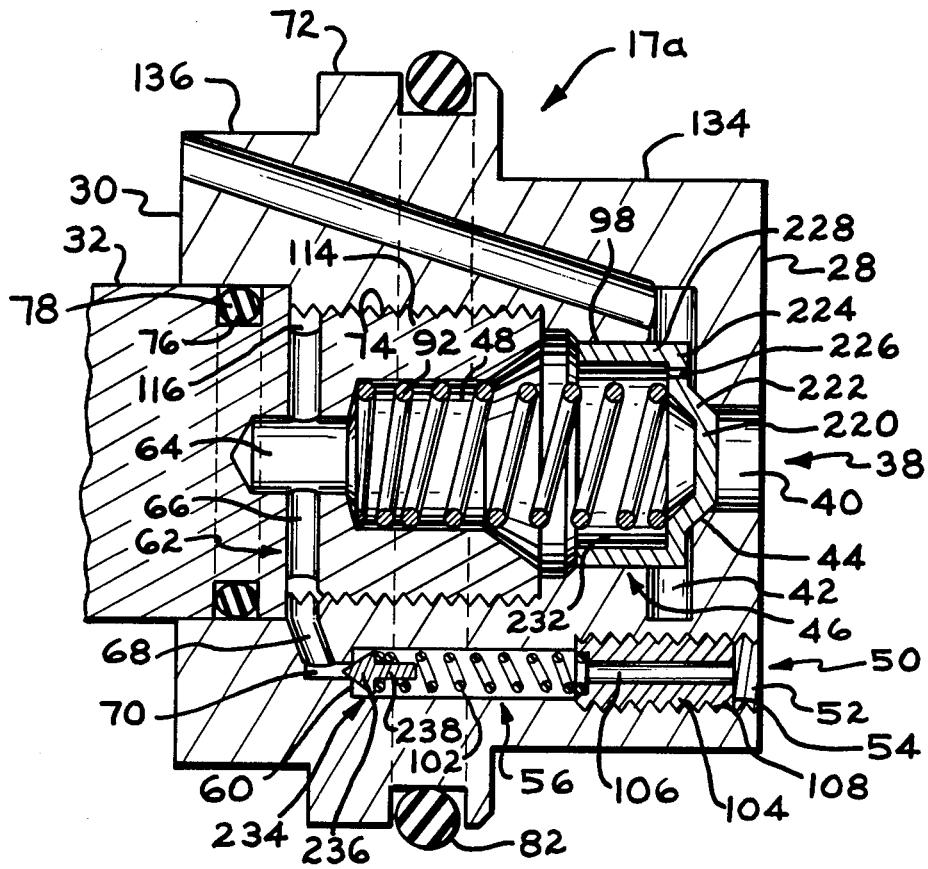
FIG. 5 is a detail view of a second embodiment of a piston assembly including valve means according to the invention.
Figures 6, 7:
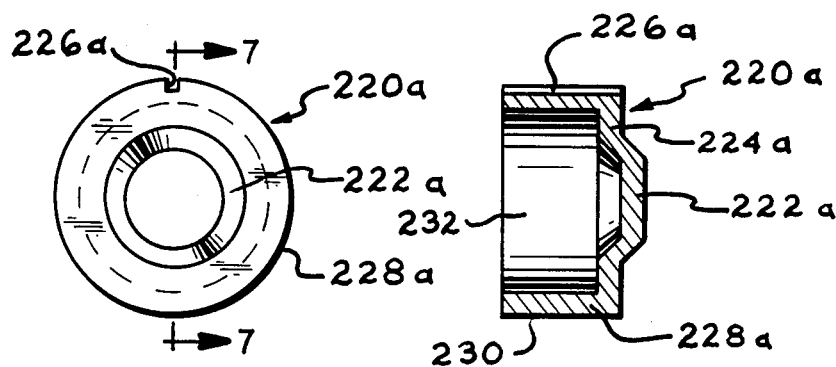
FIG. 6 is a front elevational view of a valve member alternatively usable in a piston assembly according to the invention.
FIG. 7 is a sectional view of the valve member of FIG. 6, taken in the direction of line 7—7 in FIG. 6.

FIGS. 5, 6 and 7 relate to alternate embodiments of the invention, which may be suitable for certain applications, and which utilize valve means including poppet members rather than ball members.

In FIG. 5, a piston 17a is shown, which is physically identical to piston 17a, except for the absence of valve balls 90 and 100, and which operates in exactly the same manner, and may be modified in the same manner. In FIG. 5, the valve ball 90 of FIG. 3 is replaced with a valve member shown as a poppet member 220, having a first portion 222 which cooperates with valve seat 44, and intermediate portion 224 which defines an aperture shown as aperture 226 therethrough, and a body portion 228 which acts as a guide for poppet member 220 in cooperation with peripheral wall 98 of valve pocket portion 46. As will be apparent, the relationship between the flow area of aperture 226 to that of passage 70 must be the same as that between small gap 94 and passage 70 in the description regarding the structure shown in FIG. 3.

Referring briefly to FIGS. 6 and 7, there is shown a poppet member 220a which is interchangeable as a valve member with poppet member 220. Like poppet member 220, poppet member 220a includes a first portion 222a, an intermediate portion 224a and a body portion 228a. However, an aperture shown as bypass groove 226a replaces aperture 226 of poppet member 220, and serves the same function as aperture 226, or as gap 94, and bears the same relationship with the flow area of passage 70 for proper operation. As shown, bypass groove 226 is formed in peripheral surface 230 of body portion 228a. As illustrated, valve members shown as poppet members 220 and 220a are generally cup-shaped, and define a spring pocket portion 232 which cooperates with resilient means shown as spring 92. As will become apparent, poppet members 220 or 220a may be provided with means such as a projection in spring pocket portion 232 cooperating with resilient means such as spring 92 to maintain such a spring in a centered position, or the size of the spring relative to first portion 222, 222a may be adjusted to utilize the contour of first portion 222, 222a as a spring positioning surface.

Also in FIG. 5, the second valve element shown as valve ball 100 in FIG. 3 is here shown as a valve poppet member 234 having a generally conical shaped seating portion 236 which cooperates with valve seat 60, and a stem portion 238 adapted to be received within the coils of resilient means shown as spring 102. As will be apparent, valve poppet member 234 operates in exactly the same way as second valve element or valve ball 100. It is believed that the existence of stem portion 238 may be advantageous in reducing valve chatter in some applications.

As will be apparent, piston 17a is assembled in the same fashion as piston 17, except that a poppet member 220, 220a is substituted for valve ball 90, and a valve poppet member 234 is substituted for a valve ball 100.

Hydraulic cylinder 10 is provided with mounting means 138 at a second or mounting end 140 including a transverse bore 142 adapted to receive a mounting pin 144, which includes first and second conduits for supplying fluid to first and second chambers 22 and 24. A first conduit portion 146 is connected through a radial passage 148 to an annular groove 150, which is positioned in alignment with a first passage in mounting means 138 which is connected to first chamber 22. A second conduit portion 154 is connected to a radial passage 156, which is in turn joined to an annular groove 158, which is positioned in alignment with a second passage 160 formed in mounting means 138. FIG. 1 is broken away at portion 162 to show that passage 160, in the preferred embodiment is formed by a bore which intersects transverse bore 142, and is plugged at an exterior surface 164 of mounting means 138 by a ball 166 which is driven into passage 160.

Mounting pin 144, and corresponding portions of mounting means 138, are adapted to prevent undesired flow of fluid, in conventional manner. A seal means, shown as O-ring 168, is disposed in a seal pocket 170, formed by annular grooves in both bore 142 and in mounting pin 44, to prevent the flow of fluid from annular groove 150 to annular groove 158. A seal means, shown as an O-ring 172, is disposed in a seal pocket 174 defined by annular grooves in both bore 142 and mounting pin 144, to prevent the leakage of fluid from annular groove 158 to the exterior of hydraulic cylinder 10. Seal means, shown as O-rings 173 and 174, are disposed in seal pockets 176 and 178, respectively, also defined by annular grooves in both bore 142 and pin 144, to prevent the leakage of fluid from annular groove 150 to the exterior of cylinder 10. Seal means 173 is provided primarily as a dirt seal, although functioning as a secondary fluid pressure seal.

Figure 4:
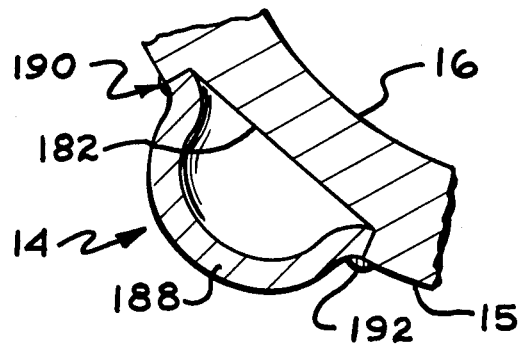
FIG. 4 is a sectional view taken in the direction of line 4—4 in FIG. 1, showing an integral conduit according to the invention.

Referring particularly to FIGS. 1, 2 and 4, passage 160 intersects integral conduit 14, which is defined by a slot or groove, shown as a shallow, flat-bottom slot or groove 182 in exterior surface 15 extending from a point adjacent mounting end 140 to a point 186 adjacent rod end 34, and covered by a cover member, here shown as a cover member 188 shown as a generally C-shaped cover, which is fastened over groove 182, such as by welding, preferably electron beam welding, at seams 190, 192, thus forming integral conduit 14. Slot or groove 182 is preferably formed by milling, although it may also be part of an extrusion, if it is desired to form cylinder 10 in several parts. As shown, an aperture 194 is provided through housing 12 to interconnect integral conduit 14 and second chamber 24.

Rod end 34 of cylinder 10 may be sealed in any convenient conventional manner. However, in the preferred embodiment, a rod seal means 200, which engages housing 12 by means of mating threaded portions 202, includes means shown as O-ring 204 for sealing between rod seal means 200 and inner surface 16, and a rod seal 206 and rod wiper 208 for sealing between piston rod 32 and chamber 24. As shown, rod seal means 200 is cup shaped, including a portion 210. Portion 210 may be made as long as desired, to provide threaded portions 202 as long as desired, to withstand a desired pressure. Since portion 210 is shown as extended inwardly, towards end 140, beyond aperture 194, rod seal means 200 is provided with an annular groove 212 which is aligned with aperture 194, and further includes at least one aperture 214 interconnecting annular groove 212 and second chamber 24.

Thus, the preferred embodiment of the invention provides a hydraulic cylinder which includes a piston having valve means which operate in a stepwise manner at a pressure that can be easily and precisely set, and which includes a rugged integral conduit for fluid on its exterior surface, to allow the use of an inexpensive and rugged solid piston rod with such a hydraulic cylinder, and which requires no external fluid lines, since its mounting pin includes its fluid supply conduits.

As will be apparent, numerous modifications and variations of the illustrated embodiment of the invention may be easily made by one skilled in the art, and various features of the preferred embodiment may obviously be used in isolation from others, without departing from the spirit and scope of the invention.

I claim:

1. A hydraulic cylinder, comprising:
   a cylindrical housing;
   a piston slidably disposed in said housing and including a piston rod protruding from said piston and extending to the exterior of said hydraulic cylinder;
   pilot-actuated relief valve means stepwise operable by a first predetermined hydraulic pressure disposed in said piston for stepwise allowing said piston to move in a first direction when a force acting in said first direction and having a magnitude in excess of a first predetermined value is applied to said piston rod;
   said valve means being proportionally operable by a second hydraulic pressure substantially lower than said first hydraulic pressure for allowing said piston to move in a second direction at a rate proportioned to a force in excess of a second predetermined force acting in said second direction is applied to said piston rod.

2. A hydraulic cylinder according to claim 1, wherein:
   said piston includes a first surface and a second surface, said piston rod protruding from said second surface;
   said valve means including a first aperture formed in said piston;
   said first aperture including a first entry portion formed in said first surface, a first valve seat portion connected to said entry portion, a first valve pocket element portion connected to said entry portion, and a first spring pocket portion connected to said valve element pocket portion;
   said valve means further including a second aperture formed in said piston;
   said second aperture including a second entry portion formed in said first surface, a second spring pocket portion connected to said second entry portion, and a second valve seat portion;
   said piston further defining a first passage interconnecting said first spring pocket portion and said second valve seat portion, and a second passage interconnecting said first valve seat portion and said second surface;
   a first valve element being disposed in said first valve element pocket portion and defining a third aperture interconnecting said first valve seat portion and said first spring pocket portion;
   a first spring means being disposed in said first spring pocket portion and urging said first valve element against a first valve seat of said first valve seat portion;
   a second valve element disposed in said second valve seat portion;
   a second spring means being disposed in said second spring pocket portion and urging said second valve element against a second valve seat of said second valve seat portion.

3. A hydraulic cylinder according to claim 1, wherein:
   said hydraulic cylinder includes a rod end, said piston rod protruding from said rod end, and a mounting end;
   said housing having an exterior surface and an inner surface defining a working chamber having a first end and a second end;
   said piston dividing said working chamber into a first chamber and a second chamber, said second chamber being proximal to said rod end of said hydraulic cylinder and distal to said mounting end of said hydraulic cylinder;
   said hydraulic cylinder including means for supplying hydraulic fluid to said second chamber and to said first chamber disposed at said mounting end of said hydraulic cylinder;
   said housing having a groove in said exterior surface extending from a point adjacent to said mounting end to a point adjacent to said rod end, said housing including a cover member fastened over said groove and defining a conduit between said mounting end and said rod end for supplying hydraulic fluid to said second chamber;
   said means for supplying fluid to said second chamber disposed at said rod end of said hydraulic cylinder including a second conduit interconnecting a source of hydraulic fluid and a first end of said groove; and
   said housing includes an aperture between a second end of said groove and said second chamber.

4. A hydraulic cylinder, comprising:
   a cylindrical housing having an exterior surface and an inner surface defining a working chamber having a first end and a second end;
   a piston slidably disposed in said working chamber and dividing said working chamber into a first chamber and a second chamber and having a first surface disposed adjacent said first end of said chamber and a second surface disposed adjacent said second end of said chamber;
   said piston including a piston rod, said piston rod protruding from said second surface and extending through said second chamber and protruding from a first end of said cylinder;
   said hydraulic cylinder including means for supplying hydraulic fluid to said first chamber and to said second chamber disposed at said first end of said hydraulic cylinder;
   said housing having a groove in said exterior surface extending from a point adjacent to a second end of said cylinder to a point adjacent to said first end of said cylinder, said housing including a cover member fastened over said groove and defining a conduit between said second end of said cylinder and said first end of said cylinder for supplying hydraulic fluid to said second chamber;

said means for supplying fluid to said second chamber disposed at said first end of said hydraulic cylinder including a second conduit interconnecting a source of hydraulic fluid and a first end of said groove; and said housing includes an aperture between a second end of said groove and said second chamber.

5. A hydraulic cylinder, comprising:

a cylindrical housing having an exterior surface and an inner surface defining a working chamber having a first end and a second end;

a piston slidably disposed in said working chamber and dividing said working chamber into a first chamber and a second chamber and having a first surface disposed adjacent said first end of said chamber and a second surface disposed adjacent said second end of said chamber;

said piston including a piston rod, said piston rod protruding from said second surface and extending through said second chamber and protruding from a rod end of said cylinder;

said hydraulic cylinder including mounting means at a mounting end of said cylinder distal to said rod end, said mounting means having a bore therethrough adapted to receive a mounting pins means therethrough, said mounting pin means including first and second conduits therein for supplying said fluid to said first chamber and to said second chamber;

said mounting means defining a first passage adapted to interconnect said first conduit and said first chamber;

said housing having a groove in said exterior surface extending from a point adjacent to said mounting end to a point adjacent to said rod end, said housing including a cover member fastened over said groove and defining a third conduit between said mounting end and said rod end;

said mounting means defining a second passage adapted to interconnect said second conduit and a first end of said third conduit;

said housing defining a third aperture therethrough for interconnecting said third conduit and said second chamber, at a second end of said third conduit;

said cylinder including rod seal means at said rod end of said cylinder, said piston rod extending through said rod seal means, said rod seal means sealingly engaging said inner surface and said piston rod and defining an annular groove adapted to cooperate with said third aperture and at least one fourth aperture interconnecting said annular groove and an inner surface of said rod seal means for allowing the flow of fluid between said third conduit and said second chamber.

6. A hydraulic cylinder, comprising:

a cylindrical housing having an exterior surface and an inner surface defining a working chamber having a first end and a second end;

a piston slidably disposed in said working chamber and dividing said working chamber into a first chamber and a second chamber and having a first surface disposed adjacent said first end of said chamber and a second surface disposed adjacent said second end of said chamber;

said piston including a piston rod, said piston rod protruding from said second surface and extending through said second chamber and protruding from a first end of said cylinder;

said piston including valve means therein;

said valve means including a first aperture formed in said piston;

said first aperture including a first entry portion formed in said first surface, a first valve seat portion connected to said entry portion, a first valve element pocket portion connected to said entry portion, and a first spring pocket portion connected to said valve element pocket portion;

said valve means further including a second aperture formed in said piston;

said second aperture including a second entry portion formed in said first surface, a second spring pocket portion connected to said second entry portion, and a second valve seat portion;

said piston further defining a first passage interconnecting said first spring pocket portion and said second valve seat portion, and a second passage interconnecting said first valve seat portion and said second surface;

a first valve element being disposed in said first valve element pocket portion and defining a third aperture interconnecting said first valve seat portion and said first spring pocket portion;

a first spring means being disposed in said first spring pocket portion and urging said first valve element against a first valve seat of said first valve seat portion;

a second valve element disposed in said second valve seat portion;

a second spring means being disposed in said second spring pocket portion and urging said second valve element against a second valve seat of said second valve seat portion;

said first valve element and said first spring means being adapted to allow a flow of fluid between said first surface and said second surface, through said first entry portion and said first valve seat portion and said second passage, in proportional response to a low pressure applied to said first entry portion;

said first valve element and said first valve spring means and said second valve element and said second valve spring means being adapted to stepwise allow a flow of fluid between said second surface and said first surface through said second passage and said first valve seat portion and said first entry portion in response to a predetermined high pressure applied to said second surface, fluid under said predetermined high pressure passing through said second passage and said first valve seat portion and said third aperture and said first spring pocket portion and said first passage to urge said second valve element away from said second valve seat and allow said fluid to flow to said first surface through said second spring pocket portion and said second entry portion, to reduce the pressure in said first spring pocket portion and allow said fluid to urge said first valve element away from said first valve seat and allow said fluid to flow from said second surface to said first surface through said second passage and said first valve seat portion and said first entry portion;

said hydraulic cylinder including means for supplying hydraulic fluid to said first chamber and to said second chamber disposed at said first end of said hydraulic cylinder;

said housing having a groove in said exterior surface extending from a point adjacent to said second end of said cylinder to a point adjacent to said first end of said cylinder, said housing including a cover member fastened over said groove and defining a conduit between said second end of said cylinder and said first end of said cylinder for supplying hydraulic fluid to said second chamber;

said means for supplying fluid to said second chamber disposed at said first end of said hydraulic cylinder including a second conduit interconnecting a source of hydraulic fluid and a first end of said groove; and said housing includes an aperture between a second end of said groove and said second chamber.

7. A hydraulic cylinder, comprising:

a cylindrical housing having an exterior surface and an inner surface defining a working chamber having a first end and a second end;

a piston slidably disposed in said working chamber and dividing said working chamber into a first chamber and a second chamber and having a first surface disposed adjacent said first end and a second surface disposed adjacent said second end;

said piston including a piston rod, said piston rod protruding from said second surface and extending through said second chamber and protruding from a rod end of said cylinder;

said piston including valve means therein;

said valve means including a first aperture formed in said piston;

said first aperture including a first entry portion formed in said first surface, a first valve seat portion connected to said entry portion, a first valve pocket element portion connected to said entry portion, and a first spring pocket portion connected to said valve element pocket portion;

said valve means further including a second aperture formed in said piston;

said second aperture including a second entry portion formed in said first surface, a second spring pocket portion connected to said second entry portion, and a second valve seat portion;

said piston further defining a first passage interconnecting said first spring pocket portion and said second valve seat portion, and a second passage interconnecting said first valve seat portion and said second surface;

a first valve element being disposed in said first valve element pocket portion and defining a third aperture interconnecting said first valve seat portion and said first spring pocket portion;

a first spring means being disposed in said first spring pocket portion and urging said first valve element against a first valve seat of said first valve seat portion;

a second valve element disposed in said second valve seat portion;

a second spring means being disposed in said second spring pocket portion and urging said second valve element against a second valve seat of said second valve seat portion, said second spring means being retained in said second spring pocket portion by an apertured plug defining an aperture interconnecting said second entry portion and said second spring pocket portion;

said first valve element and said first spring means being adapted to allow a flow of fluid between said first surface and said second surface, through said first entry portion and said first valve seat portion and said second passage, in proportional response to a low pressure applied to said first entry portion;

said first valve element and said first valve spring means and said second valve element and said second valve spring means being adapted to stepwise allow a flow of fluid between said second surface and said first surface through said second passage and said first valve seat portion and said first entry portion in response to a predetermined high pressure applied to said second surface, fluid under said predetermined high pressure passing through said second passage and said first valve seat portion and said third aperture and said first spring pocket portion and said first passage to urge said second valve element and allow said fluid to flow to said first surface through said second spring pocket portion and said apertured plug and said second entry portion, to reduce the pressure in said first spring pocket portion and allow said fluid to urge said first valve element away from said first valve seat and allow said fluid to flow from said second surface to said first surface through said second passage and said first valve seat portion and said first entry portion;

said hydraulic cylinder including mounting means at a mounting end of said cylinder distal to said rod end, said mounting means having a bore therethrough adapted to receive a mounting pin means therethrough, said mounting pin means including first and second conduits therein for supplying said fluid to said first chamber and to said second chamber;

said mounting means defining a first passage adapted to interconnect said first conduit and said first chamber;

said housing having a groove in said exterior surface extending from a point adjacent to said mounting end to a point adjacent to said rod end, said housing including a cover member fastened over said groove and defining a third conduit between said mounting end and said rod end;

said mounting means defining a second passage adapted to interconnect said second conduit and a first end of said third conduit;

said housing defining a third aperture therethrough for interconnecting said third conduit and said second chamber, at a second end of said third conduit;

said cylinder including rod seal means at said rod end of said cylinder, said piston rod extending through said rod seal means, said rod seal means sealingly engaging said inner surface and said piston rod and defining an annular groove adapted to cooperate with said third aperture and at least one fourth aperture interconnecting said annular groove and an inner surface of said rod seal means for allowing the flow of fluid between said third conduit and said second chamber.

8. A hydraulic cylinder, according to claim 7, wherein:

a cup-shaped stop piston is slidably disposed in said first chamber between said first surface of said piston and said first end of said working chamber to position said piston rod in an adjustable retracted position.

* * * * *